(12) United States Patent
Morrow et al.

(10) Patent No.: US 8,839,427 B2
(45) Date of Patent: Sep. 16, 2014

(54) WAN DEFENSE MITIGATION SERVICE

(75) Inventors: Christopher Morrow, Reston, VA (US); James Gill, Falls Church, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1621 days.

(21) Appl. No.: 11/104,609

(22) Filed: Apr. 13, 2005

(65) Prior Publication Data

US 2006/0236394 A1   Oct. 19, 2006

(51) Int. Cl.
  *G06F 21/00*   (2013.01)
  *H04L 29/06*   (2006.01)

(52) U.S. Cl.
  CPC ................................. *H04L 63/1458* (2013.01)
  USPC .............................................. 726/23; 726/13

(58) Field of Classification Search
  CPC . H04L 63/14; H04L 63/1408; H04L 63/1441; H04L 63/145; H04L 63/1458; H04L 63/1416; H04L 63/20; H04L 12/63; H04L 12/4633
  See application file for complete search history.

(56) References Cited

U.S. PATENT DOCUMENTS

| | | | | |
|---|---|---|---|---|
| 6,415,323 | B1 * | 7/2002 | McCanne et al. | 709/225 |
| 2002/0032871 | A1 * | 3/2002 | Malan et al. | 713/201 |
| 2004/0148520 | A1 * | 7/2004 | Talpade et al. | 713/201 |
| 2005/0044141 | A1 * | 2/2005 | Hameleers et al. | 709/204 |
| 2005/0165953 | A1 * | 7/2005 | Oba et al. | 709/238 |

OTHER PUBLICATIONS

C. Partridge et al.; "Host Anycasting Service"; Nov. 1993; pp. 1-8.
D. Farinacci et al.; "Generic Routing Encapsulation"; The Internet Society; 2000; pp. 1-5.
Cisco Systems, Inc.; "Cisco Anomaly Guard Module"; Feb. 4, 2005; pp. 1-11.
B. Carpenter et al.; "Ipv4 Address Behaviour Today"; Feb. 1997; pp. 1-12.

* cited by examiner

*Primary Examiner* — Michael S McNally
*Assistant Examiner* — Carlton Johnson

(57) ABSTRACT

A mitigation service may be used to mitigate a network attack in a network including a group of mitigation devices. Datagrams, intended for a customer that is subject of a network attack, may be received by at least one of the mitigation devices based on an anycast address associated with the mitigation devices. Each of the mitigation devices is addressable via the anycast address. The received datagrams may be processed to remove malicious datagrams and leave legitimate datagrams. The legitimate datagrams may be forwarded to the customer via a tunnel configured between an address associated with the customer and the anycast address associated with the mitigation devices.

24 Claims, 10 Drawing Sheets

WAN DEFENSE MITIGATION SERVICE

BACKGROUND

1. Field of the Invention

Implementations described herein relate generally to network attacks and, more particularly, to tools for mitigating distributed denial of service (DDoS) attacks, and other forms of attacks.

2. Description of Related Art

DDoS attacks are a real, growing threat to businesses worldwide. Designed to elude detection by today's most popular tools, these attacks can quickly incapacitate a targeted business, costing victims thousands, if not millions, of dollars in lost revenue and productivity.

DDoS attacks paralyze Internet systems by overwhelming servers, network links, and network devices (e.g., routers, firewalls, etc.) with bogus traffic. Easily launched against limited defenses, DDoS attacks not only target individual web sites or other servers at the edge of the network, but they also subdue the network itself.

The growing dependence on the Internet makes the impact of successful DDoS attacks increasingly painful (financially and otherwise) for service providers, enterprises, and government agencies. Newer, more powerful DDoS tools promise to unleash even more destructive attacks in the months and years to come.

Because DDoS attacks are among the most difficult to defend against, responding to them appropriately and effectively poses a tremendous challenge for all Internet-dependent organizations. Network devices and traditional perimeter security technologies, such as firewalls and intrusion detection systems (IDSs), although important components of an overall security strategy, do not by themselves provide comprehensive DDoS protection.

Current techniques used to deal with DDoS attacks fall short in terms of mitigation and ensuring business continuity. Some of the more popular DDoS responses, such as blackholing and router filtering, are not optimized to deal with the increasingly sophisticated attacks being seen today. IDSs offer some excellent attack detection capabilities, but cannot mitigate the impact of the attacks. Firewalls offer a rudimentary level of protection but, like blackholing and router filtering, they were not designed to protect against the types of advanced attacks that are so common today. Still other strategies, such as overprovisioning, do not provide adequate protection against ever larger attacks, and they are far too costly as a DDoS prevention strategy.

SUMMARY

According to one aspect, a method for mitigating a network attack in a network including a group of mitigation devices is provided. The method may include receiving traffic, intended for a customer device that is subject of a network attack, by at least one of the mitigation devices based on an anycast address associated with the mitigation devices, where each of the mitigation devices is addressable via the anycast address; processing the received traffic to remove malicious traffic and leave legitimate traffic; and forwarding the legitimate traffic to the customer device.

According to another aspect, a method for mitigating a network attack in a network including a group of mitigation devices is provided. The method may include receiving traffic, intended for a customer device that is subject of a network attack, by at least one of the mitigation devices; processing the received traffic to remove malicious traffic and leave legitimate traffic; and forwarding the legitimate traffic to the customer device via a tunnel.

BRIEF DESCRIPTION OF THE DRAWINGS

The accompanying drawings, which are incorporated in and constitute a part of this specification, illustrate one or more embodiments of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

Overview

DDoS attacks work by taking advantage of Internet protocols and the fundamental benefit of the Internet of delivering datagrams from nearly any source to any destination, without prejudice. Essentially, it is the behavior of these datagrams that defines the DDoS attack: either there are too many, overwhelming network devices as well as servers, or they are deliberately incomplete to rapidly consume server resources. What makes DDoS attacks so difficult to prevent is that illegitimate datagrams are indistinguishable from legitimate datagrams, making detection difficult. Many of these attacks also use spoofed source IP addresses, thereby eluding source identification by anomaly-based monitoring tools looking for unusually high volumes of traffic coming from specific origins.

A growing trend among DDoS attackers is to use sophisticated spoofing techniques and essential protocols (instead of nonessential protocols that can be blocked) to make DDoS attacks even more stealthy and disruptive. These attacks, which use legitimate application protocols and services, are very difficult to identify and defeat. Employing datagram-filtering or rate-limiting measures simply completes the attacker's task by shutting everything down, causing denial of legitimate traffic.

Figure 1:
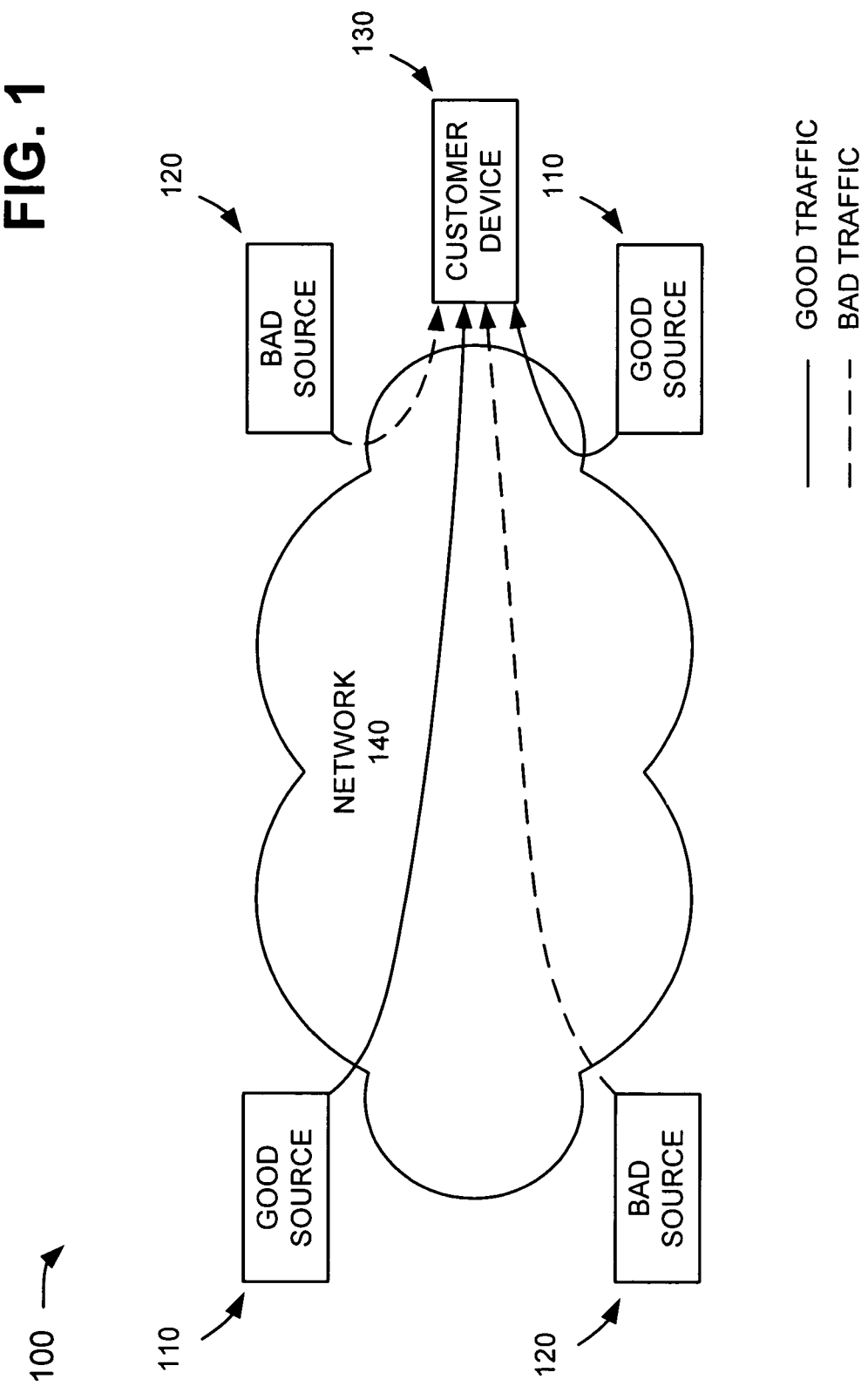
FIG. 1 is a diagram of an environment without specific countermeasures in place to mitigate network attacks.

FIG. 1 is a diagram of an environment 100 without specific countermeasures in place to mitigate network attacks. As shown in FIG. 1, environment 100 includes good sources of traffic 110 and bad sources of traffic 120 that communicate with customer device 130 via network 140. In environment 100, all traffic destined for customer device 130 flows unrestricted towards customer device 130. Customer device 130 receives both good traffic and bad traffic.

Figure 2:
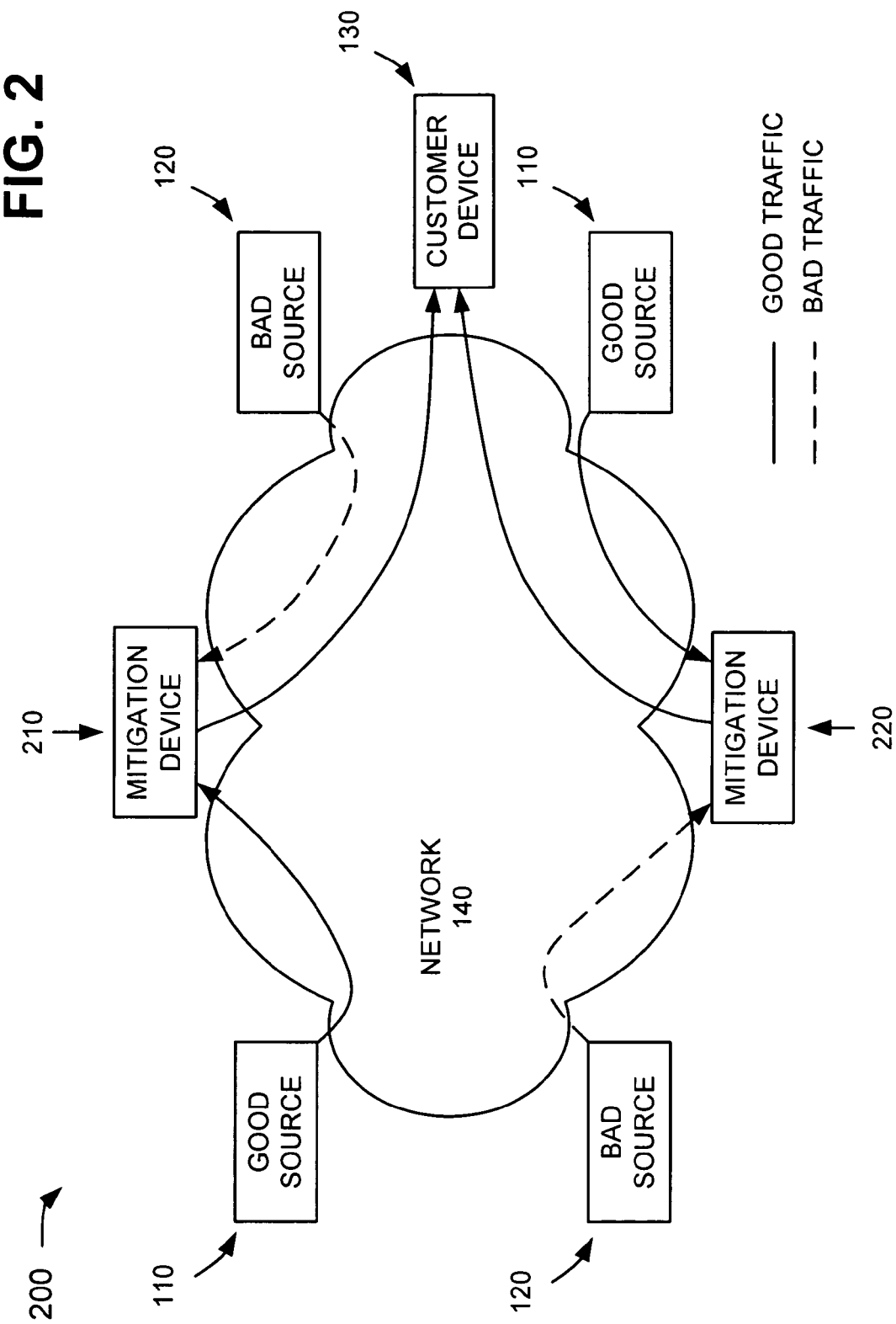
FIG. 2 is an exemplary diagram illustrating concepts consistent with the principles of the invention for mitigating a network attack.

FIG. 2 is an exemplary diagram illustrating concepts consistent with the principles of the invention for mitigating a network attack. As shown in FIG. 2, environment 200 may include good sources of traffic 110 and bad sources of traffic 120 that communicate with customer device 130 via network 140. Environment 200 may also include a set of mitigation devices 210 and 220.

When customer device 130 discovers that it is under attack, and has taken the necessary steps to identify the target of that attack, customer device 130 can divert the traffic from its normal destination to that of a mitigation device, such as mitigation device 210 and/or 220. Mitigation device 210/220 may process the traffic to remove all malicious traffic while allowing good traffic to continue flowing uninterrupted. After the traffic has been processed to remove the malicious traffic, mitigation device 210/220 may forward the good traffic to customer device 130.

Exemplary Network Configuration

Figure 3:
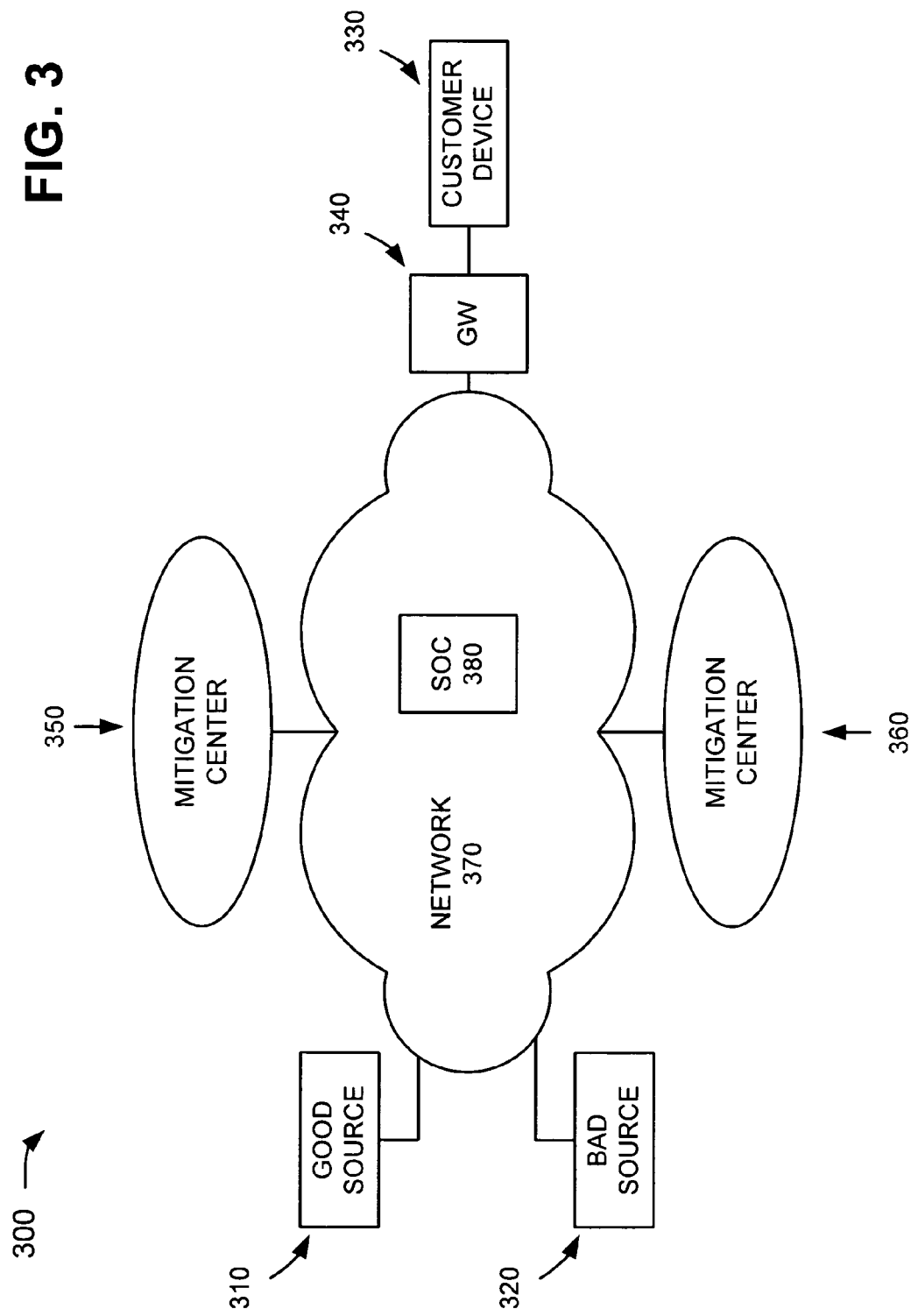
FIG. 3 is an exemplary diagram of a network in which systems and methods consistent with the principles of the invention may be implemented.

FIG. 3 is an exemplary diagram of a network 300 in which systems and methods consistent with the principles of the invention may be implemented. Network 300 may include a source of good traffic ("good source") 310, a source of bad traffic ("bad source") 320, a customer device 330, a gateway (GW) 340, a mitigation center 350, and a mitigation center 360 connected to a network 370. A single good source 310, bad source 320, customer device 330, and gateway 340, and a pair of mitigation centers 350 and 360 have been illustrated as connected to network 370 for simplicity. In practice, there may be more good sources, bad sources, customer devices, and gateways, and more or fewer mitigation centers.

Good source 310 may include a source of legitimate traffic. For example, good source 310 may include any device and/or system that transmits legitimate network traffic. Bad source 320 may include a source of malicious traffic. For example, bad source 320 may include any device and/or system that transmits malicious traffic, such as traffic for causing a network attack, such as a DDoS attack.

Customer device 330 may include any type of customer premises equipment. For example, customer device 330 may include a computer, a network of computers and/or other devices, a computer or device within a network of computers and/or other devices, a router, a gateway, a modem, a firewall, or another type of network device capable of receiving and transmitting network traffic. As shown in FIG. 3, customer device 330 may connect to network 370 via gateway 340. Gateway 340 may include a device that provides an interface between customer device 330 and network 370. Gateway 340 may receive and process traffic destined for customer device 330 and traffic from customer device 330.

Mitigation centers 350 and 360 may include mitigation devices to process traffic destined for customer device 330 upon detection of a DDoS, or some other form of, attack. Mitigation centers 350 and 360 will be described in more detail below.

Network 370 may include a local area network (LAN), a wide area network (WAN), a telephone network, such as the Public Switched Telephone Network (PSTN), an intranet, the Internet, or a combination of networks. Good source 310, bad source 320, customer device 330, gateway 340, and mitigation centers 350 and 360 may connect to network 370 via wired, wireless, and/or optical connections and, possibly via other networks and/or network devices (not shown).

As shown in FIG. 3, network 370 may include a security operations center (SOC) 380. Security operations center 380 may include devices, systems, and/or personnel responsible for managing security in network 370. For example, security operations center 380 may take measures to trace or mitigate DDoS, or other forms of, attacks.

Exemplary Mitigation Center Configuration

Figure 4:
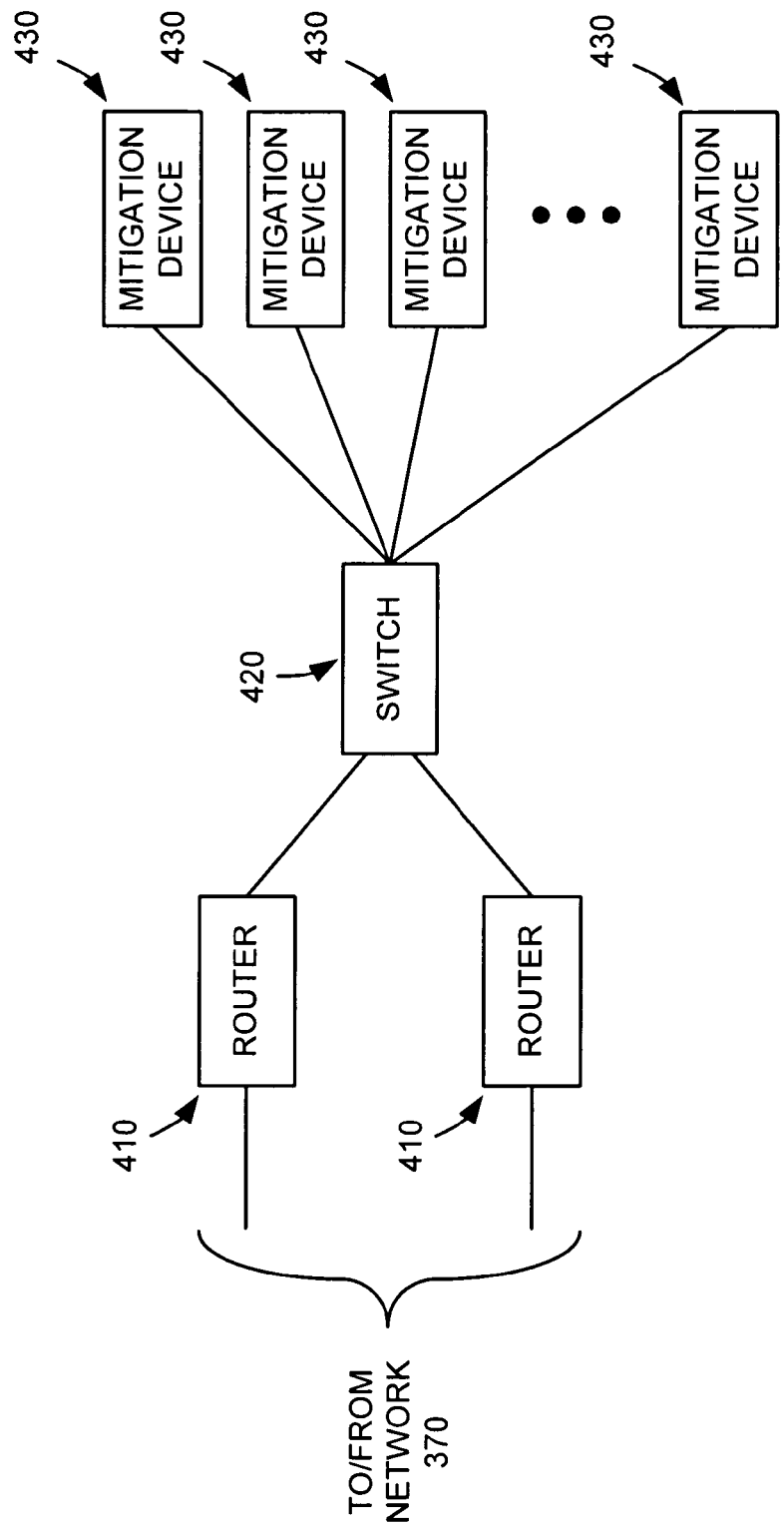
FIG. 4 is an exemplary diagram of a mediation center of FIG. 3 according to an implementation consistent with the principles of the invention.

FIG. 4 is an exemplary diagram of a mitigation center, such as mitigation center 350 or 360, according to an implementation consistent with the principles of the invention. Mitigation center 350/360 may include routers 410, switch 420, and mitigation devices 430. Routers 410 may connect to switch 420 and switch 420 may connect to mitigation devices 430 via any type or form of connection, such as an Ethernet connection (e.g., a Gigabit Ethernet connection).

Each of routers 410 may include any type of routing device to receive traffic (and other data) for mitigation center 350/360 and transmit traffic (and other data) from mitigation center 350/360 on network 370. In other words, routers 410 may represent the gateways for traffic (and other data) going to or from mitigation centers 350/360. Routers 410 may include information regarding which mitigation devices 430 are assigned to support traffic associated with particular customers and make routing decisions based on this information.

Switch 420 may include any type of switching device to forward traffic (and other data) from routers 410 to the appropriate ones of mitigation devices 430 and receive traffic (and other data) from mitigation devices 430.

Mitigation devices 430 may include devices capable of processing traffic to remove malicious traffic while allowing good traffic to flow uninterrupted. In one implementation, a mitigation device 430 may include a Cisco Guard XT device that subjects traffic to a multi-verification process that entails dynamic filtering, activation verification, anomaly recognition, protocol analysis, and rate limiting. Additional information regarding Cisco's Guard XT device can be found on Cisco's web site (www.cisco.com). In another implementation, a mitigation device 430 may include some other known type of device that is capable of processing traffic to remove malicious traffic.

In one implementation, particular mitigation devices 430 may be assigned to particular customers. For example, a first mitigation device 430 may be assigned to a first group of customers, a second mitigation device 430 may be assigned to a second group of customers, a third mitigation device 430 may be assigned to a third group of customers, etc. Another mitigation device 430 may be assigned to all of the groups of customers. In this case, this mitigation device 430 may act as a backup in case of a failure in another mitigation device 430. Mitigation devices 430 may send information regarding which customers they are assigned to support to routers 410.

Mitigation devices 430 in the different mitigation centers 350 and 360 may offer redundancy. For example, each of mitigation centers 350 and 360 may include a first mitigation device 430 assigned to a first group of customers, a second mitigation device 430 assigned to a second group of customers, etc. Therefore, if a mitigation device 430 or mitigation center 350/360 fails, another mitigation device 430 or mitigation center 350/360 can be used.

Exemplary Processing

Figure 5:
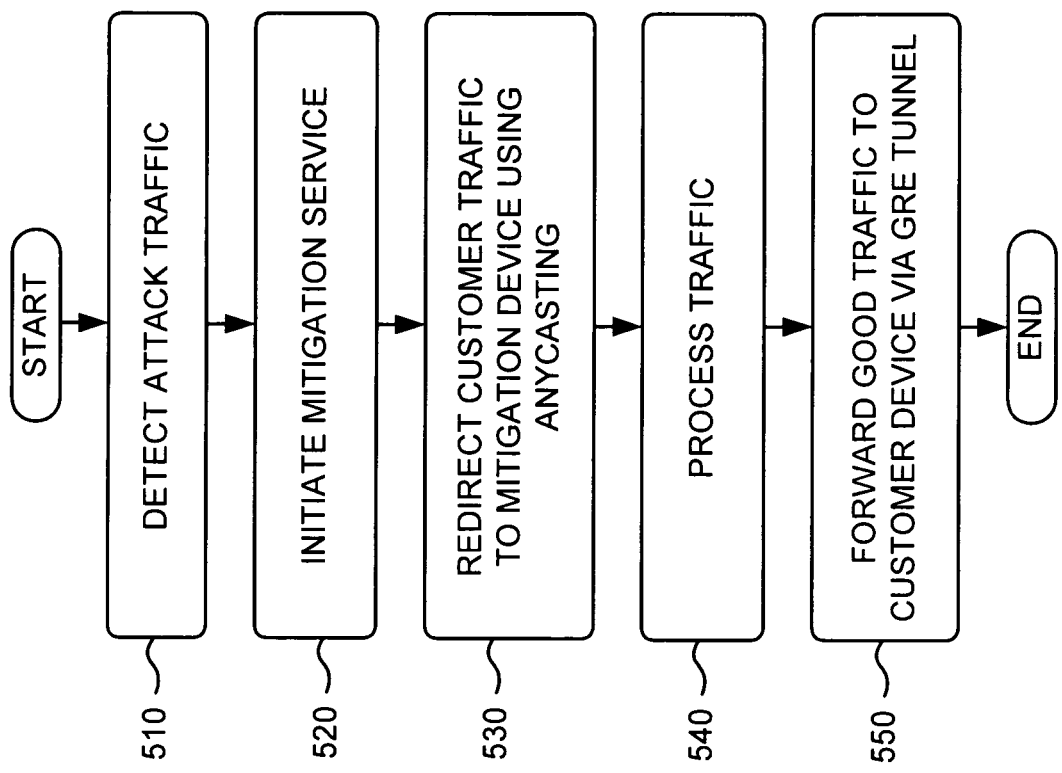
FIGS. 5-7 are flowcharts illustrating an exemplary process for mitigating a network attack according to an implementation consistent with the principles of the invention.
Figure 6:
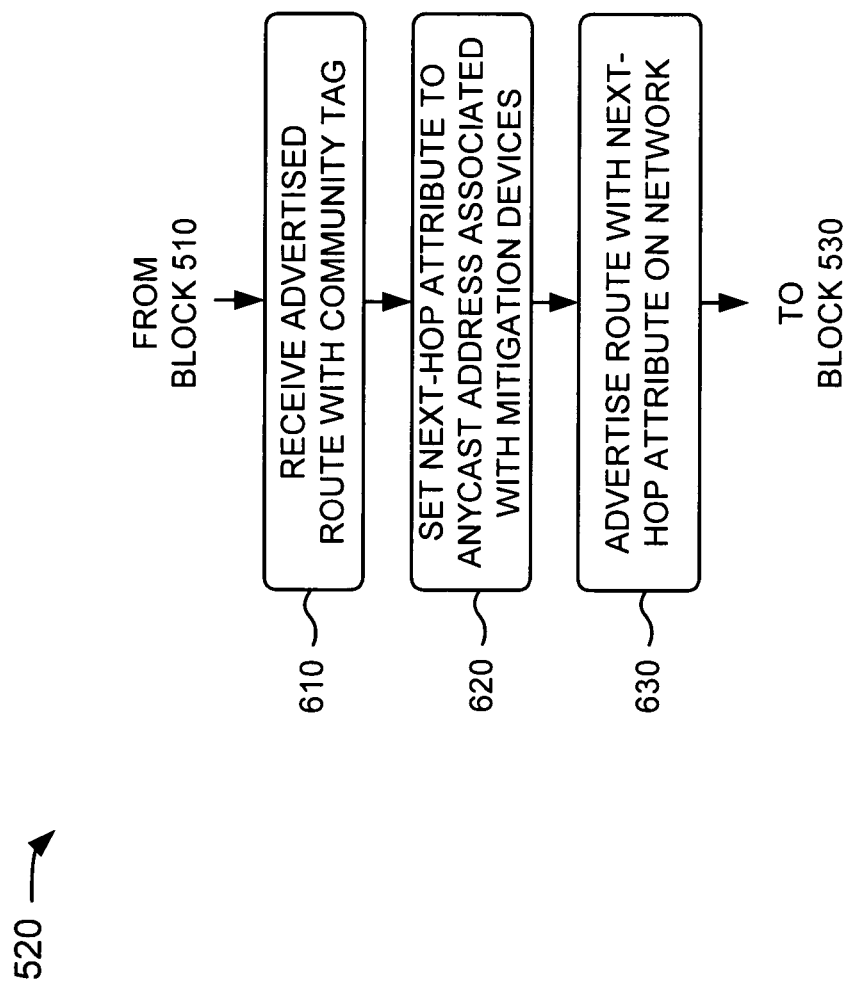
Figure 7:
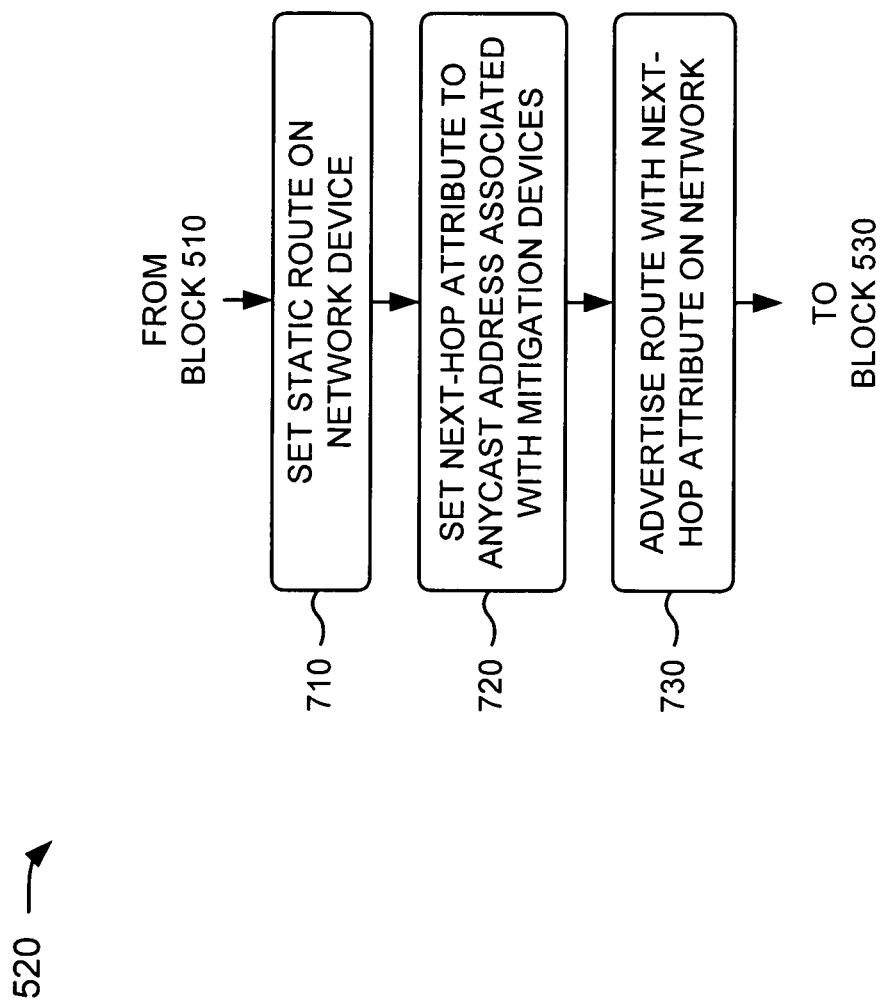

FIGS. 5-7 are flowcharts illustrating an exemplary process for mitigating a network attack according to an implementation consistent with the principles of the invention. Processing may begin with detection of an attack, such as a DDoS attack, at a customer device, such as customer device 330 (block 510) (FIG. 5). For example, customer device 330 (or a person associated with customer device 330) may determine that customer device 330 is under attack when customer device 330 is bombarded with a number of datagrams exceeding the number of datagrams that customer device 330 typically receives or is capable of receiving. In an alternative implementation, another device in network 300 may detect an attack on customer device 330.

When it is determined that customer device 330 is under attack, a mitigation service may be initiated (block 520). According to one implementation, customer device 330 may initiate the mitigation service. This is intended to also cover the situation where a device associated with customer device 330 initiates the mitigation service. According to another implementation, SOC 380 may initiate the mitigation service on behalf of customer device 330.

When customer device 330 initiates the mitigation service, customer device 330 may notify gateway 340 that it is the subject of a network attack. For example, customer device 330 may initiate (or advertise) a route, such as a border gateway protocol (BGP) route, with a community tag. Customer device 330 may choose to tag only a subset of its routes, thereby choosing which routes to mitigate and which routes to flow normally. This allows unaffected hosts or subnets to obtain normal traffic delivery, whereas attacked hosts or subnets may avail themselves of the mitigation service.

Gateway 340 may receive the advertised route with the community tag (block 610) (FIG. 6). The community tag may have a special meaning within network 370. Upon detection of the community tag, gateway 340 may set a next-hop attribute for the route or address associated with customer device 330 to an anycast address that has been chosen for mitigation services (block 620).

There are a number of situations in networking where a host, application, or user wishes to locate a node that supports a particular service but, if several nodes support the service, does not particularly care which node is used. Anycasting is an internetwork service that meets this need. A host may transmit a datagram to an anycast address and the internetwork is responsible for providing best effort delivery of the datagram to at least one, and preferably only one, of the nodes that accept datagrams for the anycast address. Multiple devices that use the same anycast address to provide a given service may be referred to as an "anycast-routed set." In the context of the mitigation service, mitigation devices 430 may be the nodes in the "anycast-routed set" that are providing the mitigation service.

Gateway 340 may set the next-hop attribute to the anycast-routed set of mitigation devices 430 as part of its ingress policy (rather than its egress policy) to ensure that gateway 340 also identifies the anycast-routed set of mitigation devices 430 as the best next-hop to which to forward traffic intended for customer device 330. If the next-hop attribute was set as part of the egress policy of gateway 340, on the other hand, any other device terminated on gateway 340 would continue to forward traffic normally to customer device 330, in effect bypassing the mitigation service. Setting the next-hop attribute as part of the ingress policy ensures that all traffic is forwarded to the anycast-routed set of mitigation devices 430.

The next-hop attribute set to the anycast-routed set of mitigation devices 430 may then be advertised on network 370 (block 630). For example, gateway 340 may transmit the customer route with the next-hop attribute associated with customer device 330 to other devices in network 370. These other devices may update their routing tables based on the next-hop attribute.

When SOC 380 initiates the mitigation service, SOC 380 may receive notification of a network attack on customer device 330. The notification may take the form of a message, a datagram, or a telephone call. SOC 380 may then initiate a route in network 370 that redirects traffic for customer device 330 to the anycast-routed set of mitigation devices 430. For example, SOC 380 may set a static route on a network device (e.g., a device within network 370) with a special tag (block 710) (FIG. 7). The special tag may indicate to the network device that the next-hop attribute for the route or address associated with customer device 330 should be changed to mitigation devices 430.

The next-hop attribute for the route or address associated with customer device 330 may then be set to the anycast address associated with the anycast-routed set of mitigation devices 430 (block 720). The next-hop attribute set to the anycast-routed set of mitigation devices 430 may then be advertised on network 370 (block 730). For example, the network device may transmit the customer route with the next-hop attribute associated with customer device 330 to other devices in network 370. These other devices may update their routing tables based on the next-hop attribute.

Returning to FIG. 5, customer traffic may then be redirected to the anycast-routed set of mitigation devices using anycasting (block 530). For example, when a network device within network 370 receives a datagram destined for customer device 330, the network device may identify the appropriate one of mitigation center 350 or 360 to which to send the datagram. The network device may, for example, use a shortest cost path algorithm to select the appropriate mitigation center 350/360.

Assume, for example, that there are three mitigation centers: a first mitigation center located in San Francisco, a second mitigation center located in Chicago, and a third mitigation center located in Washington, D.C. A network device that receives a datagram for customer device 330 may determine how far it is away from the three mitigation centers. For example, the network device might determine that it is three hops away from Washington, D.C., eight hops from Chicago, and ten hops from San Francisco. In this case, the network device may route the datagram to the third mitigation center located in Washington, D.C. based, for example, on a shortest cost path. Other network devices in network 370 may make similar decisions based on their distance (perhaps in terms of hops) to the three mitigation centers. This effectively distributes the processing of traffic for customer device 330 across network 370 and, thus, acts as a load-balancing technique.

When traffic for customer device 330 is received at a mitigation center 350/360, a router 410 within mitigation center 350/360 sends the traffic to an appropriate one of mitigation devices 430. As explained above, particular mitigation devices 430 may be assigned to particular customers. Router 410 may include information regarding which mitigation devices 430 are assigned to support traffic associated with particular customers. Router 410 may use this information to identify the mitigation device 430 to which to send traffic for customer device 330.

Mitigation device 430 may process the traffic to remove malicious traffic and leave the good traffic (block 540). In one implementation, mitigation device 430 may subject the traffic to a multi-verification process that entails dynamic filtering, activation verification, anomaly recognition, protocol analysis, and/or rate limiting. In another implementation, mitigation device 430 may use another technique to remove malicious traffic.

Mitigation device 430 may forward the good traffic to customer device 330 using a tunnel, such as a generic routing encapsulation (GRE) tunnel (block 550). A GRE tunnel may be used to traverse traffic from one place in a network to another place in the network without requiring a lot of routing decisions to be made in between those two places. A GRE tunnel is usually set up between unique source and destination addresses. Typically, a GRE tunnel is configured at both the source and the destination. For example, both the source and destination typically agree upon a configuration and verify that the tunnel is working.

In this case, a GRE tunnel may be established between the anycast address representing the anycast-routed set of mitigation devices 430 and customer device 330. Accordingly, the GRE tunnel is configured once on customer device 330 because the same GRE tunnel configuration can be used between customer device 330 and any of mitigation devices 430. Therefore, no matter which mitigation device 430 communicates with customer device 330 or whether a new mitigation device 430 is added to network 370, the same GRE tunnel configuration can be used.

To forward the good traffic to customer device 330, mitigation device 430 may apply a tunnel encapsulation to the traffic. For example, mitigation device 430 may add a header to the traffic that includes both the source address (i.e., the anycast address) and the destination address (i.e., the address associated with customer device 330). A network device that receives the tunnel traffic may recognize it as tunnel traffic and forward it onto its destination (i.e., customer device 330). When customer device 330 receives the tunnel traffic, it may strip the encapsulation and process or forward the traffic, as necessary.

EXAMPLE

Figure 8:
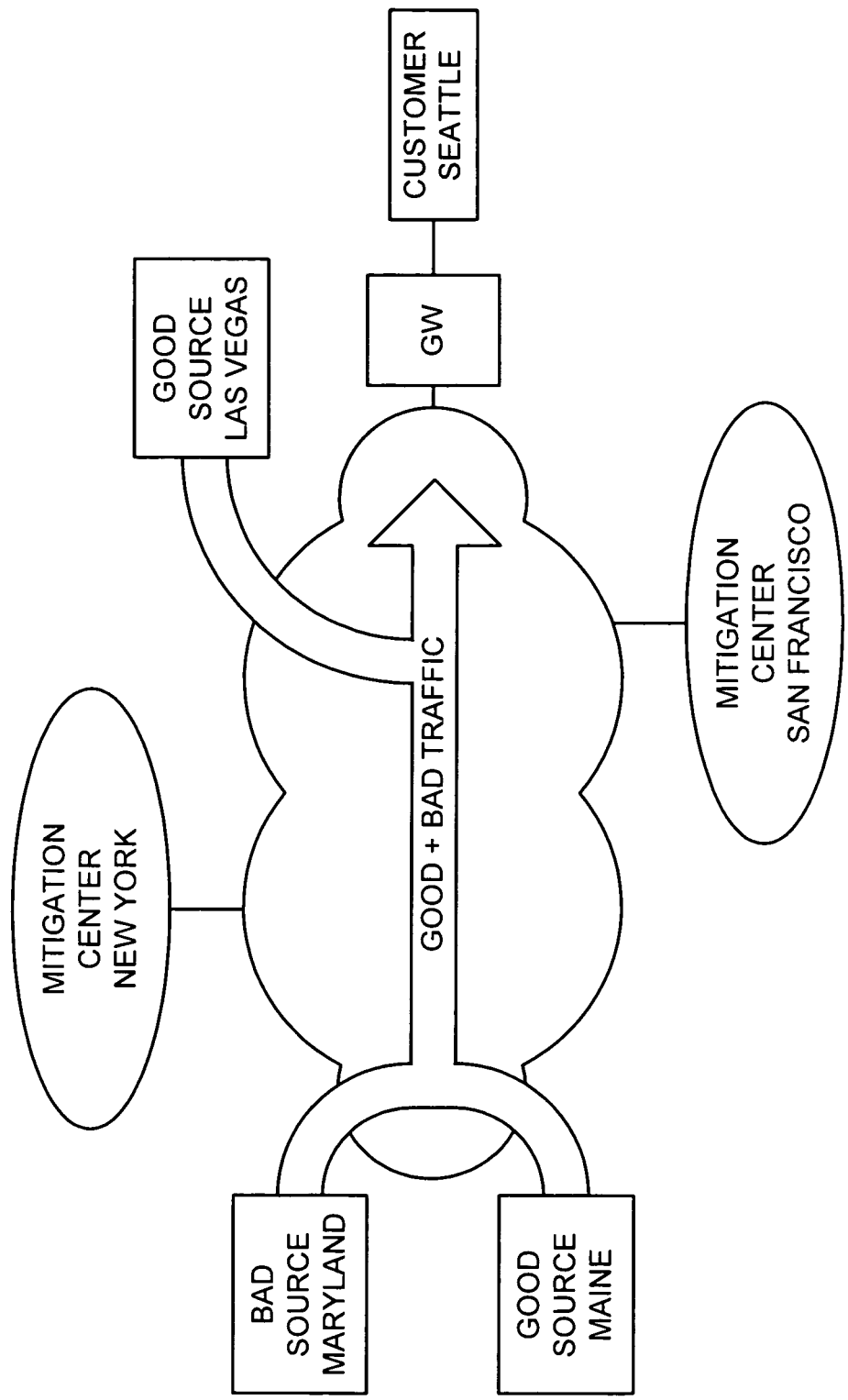
FIGS. 8-10 illustrate an example of traffic flow according to an implementation consistent with the principles of the invention.
Figure 9:
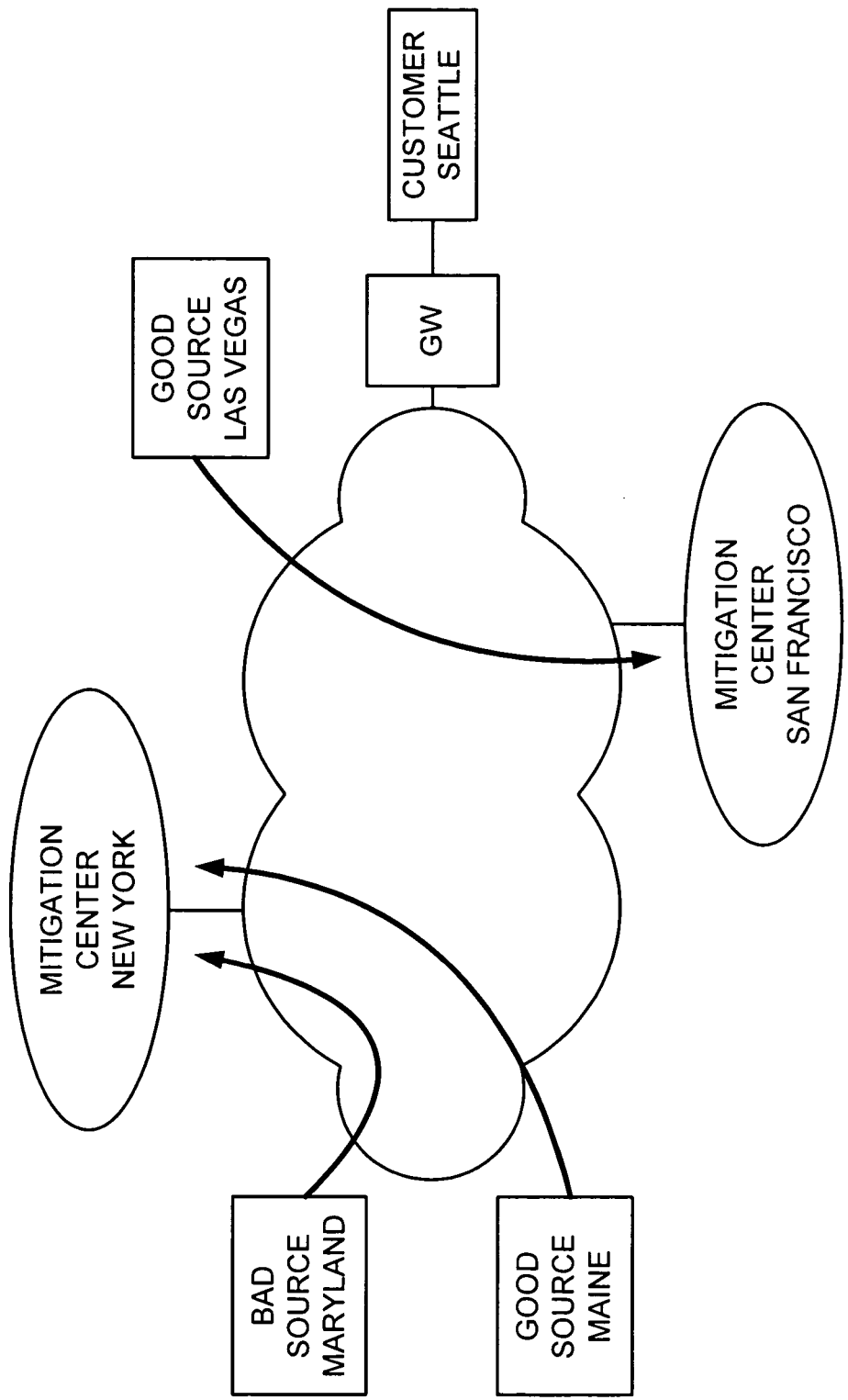
Figure 10:
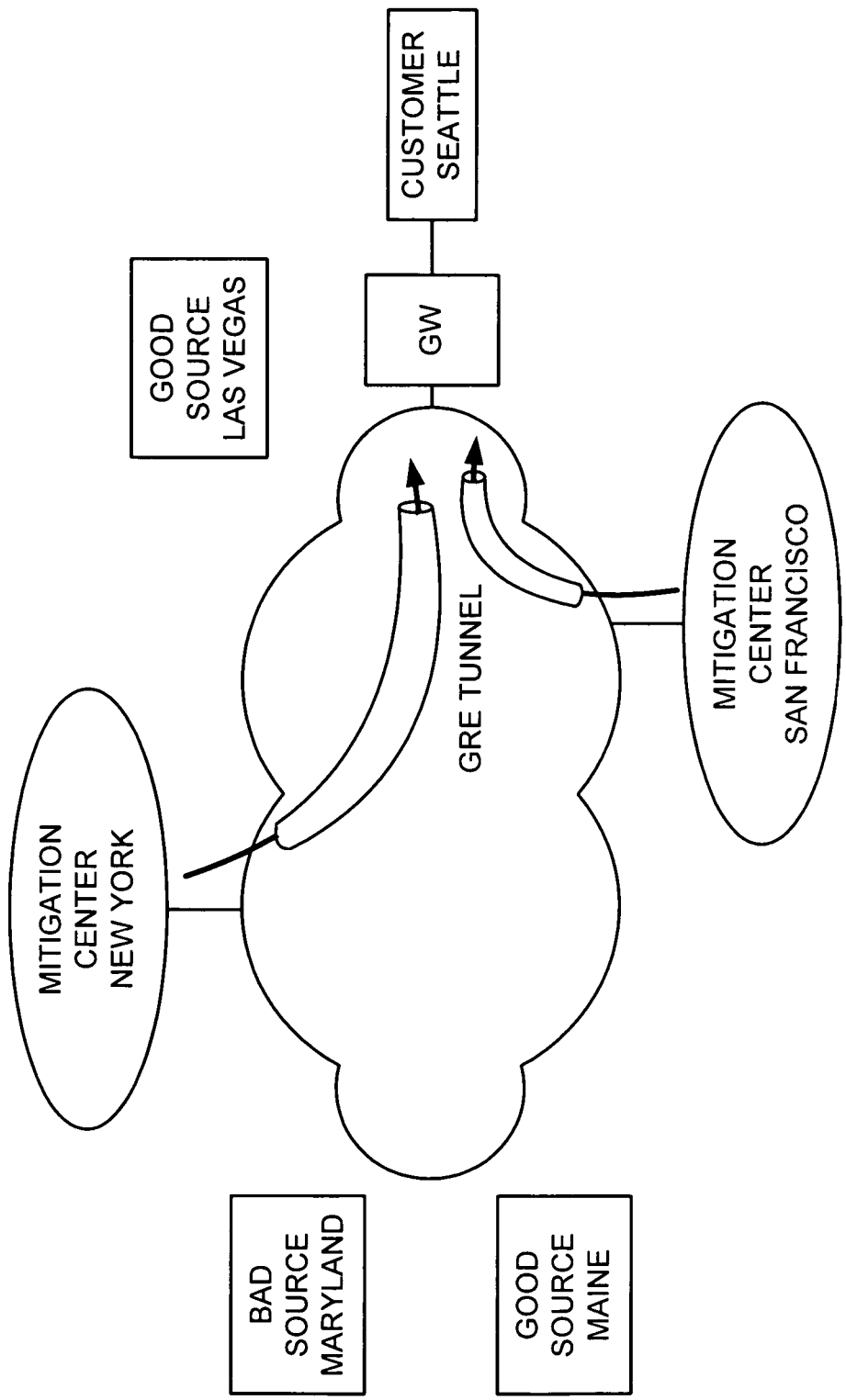

FIGS. 8-10 illustrate an example of traffic flow according to an implementation consistent with the principles of the invention. As shown in FIG. 8, a customer in Seattle receives traffic from a bad source in Maryland and good sources in Maine and Las Vegas. There are two mitigation centers located in New York and San Francisco. Assume that the bad source transmits malicious (bad) traffic, such as traffic associated with a DDoS attack, to the customer, while the good sources transmit legitimate (good) traffic to the customer.

At some point, the customer notices that it is the subject of an attack and initiates a mitigation service. As explained above, the customer may initiate the mitigation service itself or cause a SOC to initiate it on the customer's behalf. In either event, for example, initiation of the mitigation service may cause traffic from the different sources to be routed to the anycast-routed set of mitigation devices located at the different mitigation centers.

As shown in FIG. 9, each network device in the network may route traffic intended for the customer to the nearest mitigation center. A network device receiving traffic from the bad source in Maryland and/or the good source in Maine may determine that the mitigation center in New York is the closest mitigation center. For example, this network device might determine that it is three hops away from the mitigation center in New York and ten hops away from the mitigation center in San Francisco. In this case, the network device would route the traffic to the mitigation center in New York based on a shortest cost path.

Similarly, a network device receiving traffic from the good source in Las Vegas may determine that the mitigation center in San Francisco is the closest mitigation center. For example, this network device might determine that it is two hops away from the mitigation center in San Francisco and eight hops away from the mitigation center in New York. In this case, the network device would route the traffic to the mitigation center in San Francisco based on a shortest cost path.

Mitigation devices in the New York and San Francisco mitigation centers may process the traffic to remove the malicious traffic and leave the good traffic. As shown in FIG. 10, the mitigation centers may then transmit the good traffic to the customer via GRE tunnels. The GRE tunnels may permit the good traffic to be routed to the customer without further interruption.

CONCLUSION

Systems and methods consistent with the principles of the invention may provide a mitigation service for a customer subjected to a network attack, such as a DDoS attack. Traffic for the customer may be diverted to a set of mitigation devices using anycasting and good traffic may be returned to the customer via GRE tunneling.

Anycasting may considerably simplify the task of finding an appropriate mitigation device. Without using an anycast address, a list of mitigation devices would need to be consulted to identify the closest mitigation device. A gateway, on which a customer device terminates, would be statically configured with the address of that mitigation device as the next-hop for the mitigation service. Furthermore, this configuration would provide no distribution of the traffic, and would not provide redundancy in the case of a failure in a mitigation device. By employing anycasting, however, geographic load-balancing of the traffic (e.g., via shortest cost path routing) and redundancy in the case of a failure in a mitigation device or a mitigation center may be provided. Also, it may simplify GRE tunneling for returning good traffic to the customer device by requiring only a single GRE tunnel to be configured and tested at the customer device to the anycast-routed set of mitigation devices.

The foregoing description of implementations consistent with the principles of the invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 5-7, the order of the acts may be modified in other implementations consistent with the principles of the invention. Further, non-dependent acts may be performed in parallel.

Also, it has been described that various devices transmit and receive network traffic. The term "traffic" is intended to refer to any type or form of data, including packet and non-packet data. The term "datagram" may also be used to refer to any type or form of data, such as packet and non-packet data.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    receiving, by a network device, traffic intended for a customer device based on a notification, from the customer device, indicating that the customer device is subject of a network attack;
    determining, by the network device and based on receiving the traffic, a distance between the network device and each set of devices of a plurality of sets of devices,
        each set of devices including a plurality of devices that includes one or more mitigation devices;
    identifying, by the network device, a particular set of devices of the plurality of sets of devices based on determining the distance between the network device and each set of devices of the plurality of sets of devices,
        the distance between the network device and the particular set of devices being shortest out of the distance between the network device and each set of devices of the plurality of sets of devices; and
    redirecting, by the network device, the traffic to the particular set of devices using an anycast address associated with the one or more mitigation devices of the particular set of devices,
        redirecting the traffic including:
            redirecting the traffic intended for the customer device to the anycast address associated with the one or more mitigation devices of the particular set of devices,
            identifying the particular set of devices and redirecting the traffic to the particular set of devices being part of a load-balancing technique,
            each of the one or more mitigation devices, of the plurality of sets of devices, being addressable via the anycast address,
            the traffic being redirected to the particular set of devices to cause the one or more mitigation devices of the particular set of devices to:
                process the traffic to remove malicious traffic and leave legitimate traffic, and
                forward the legitimate traffic to the customer device via a tunnel.

2. The method of claim 1, where redirecting the traffic intended for the customer device further includes:
    setting a next-hop attribute for a route or an address, associated with the customer device, to the anycast address associated with the one or more mitigation devices of the particular set of devices.

3. The method of claim 1, where receiving the traffic includes:
    receiving the traffic based on a next-hop attribute, of the traffic, associated with the customer device being changed by a particular network device as part of an ingress policy of the particular network device,
        the particular network device being connected to the customer device.

4. The method of claim 1, where the particular set of devices includes a first set of devices and a second set of devices, and
    where redirecting the traffic intended for the customer device further includes:
        forwarding a portion of the traffic to the first set of devices, and
        forwarding another portion of the traffic to the second set of devices.

5. The method of claim 1, where identifying the particular set of devices comprises:
    identifying, by the network device, the particular set of devices based on a number of hops, between the network device and the particular set of devices, being less than a number of hops between the network device and another set of devices of the plurality of sets of devices.

6. The method of claim 1, where the tunnel is configured for transmitting data between the anycast address, associated with the one or more mitigation devices of the particular set of devices, and an address associated with the customer device.

7. The method of claim 6, where a configuration of the tunnel is same as a configuration of another tunnel that is used to send legitimate traffic to the customer device from the one or more mitigation devices of another set of devices of the plurality of sets of devices.

8. The method of claim 6, where the one or more mitigation devices, of the particular set of devices, apply a tunnel encapsulation to the legitimate traffic, and
    where the one or more mitigation devices, of the particular set of devices, forward the legitimate traffic with the tunnel encapsulation to the customer device via the tunnel.

9. A method comprising:
    receiving, by a device, traffic intended for a customer device based on a notification, from the customer device, indicating that the customer device is subject of a network attack,
        the traffic including malicious traffic and legitimate traffic;
    identifying, by the device and based on receiving the traffic, a particular set of devices of a plurality of sets of devices based on a distance between the device and each set of devices of the plurality of sets of devices,
        the distance between the device and the particular set of devices being shortest out of the distance between the device and each set of devices of the plurality of sets of devices,
        the particular set of devices including a plurality of particular devices;
    setting, by the device, a next-hop attribute of the traffic to an address associated with one or more particular devices of the plurality of particular devices; and
    redirecting, by the device, the traffic to the particular set of devices based on setting the next-hop attribute of the traffic,
        redirecting the traffic including:
            redirecting the traffic to the address associated with the one or more particular devices of the plurality of particular devices,
            identifying the particular set of devices and redirecting the traffic to the particular set of devices being part of a load-balancing technique,
            the traffic being redirected to the particular set of devices to cause the one or more particular devices to:
                process the traffic to remove the malicious traffic from the received traffic to obtain the legitimate traffic, and forward the legitimate traffic to the customer device via a generic routing encapsulation (GRE) tunnel, the GRE tunnel being configured by the customer device without being configured by the one or more particular devices.

10. The method of claim 9, where a tunnel encapsulation is applied to the legitimate traffic prior to the legitimate traffic being forwarded to the customer device via the GRE tunnel.

11. The method of claim 9, where redirecting the traffic to the particular set of devices based on setting the next-hop attribute of the traffic includes:
transmitting the traffic based on an anycast address associated with the one or more particular devices,
each of the one or more particular devices being addressable via the anycast address.

12. The method of claim 11, where identifying the particular set of devices comprises:
identifying the particular set of devices based on a number of hops between the particular set of devices and the device.

13. The method of claim 9, further comprising:
redirecting the traffic intended for the customer device to one or more sets of devices, of the plurality of sets of devices, using anycasting.

14. The method of claim 9, further comprising:
forwarding a portion of the traffic intended for the customer device to a first set of devices of the particular set of devices, and
forwarding another portion of the traffic intended for the customer device to a second set of devices of the particular set of devices.

15. A system comprising:
a device to:
receive traffic intended for a customer device that is subject of a network attack,
the traffic including malicious traffic and legitimate traffic;
identify a particular set of devices, of a plurality of sets of devices, based on a distance between the device and each set of devices of the plurality of sets of devices,
the distance between the device and the particular set of devices being shortest out of the distance between the device and each set of devices of the plurality of sets of devices,
the particular set of devices including a plurality of particular devices;
set a next-hop attribute of the traffic to an address associated one or more particular devices of the plurality of particular devices; and
redirect the traffic to the particular set of devices based on setting the next-hop attribute of the traffic,
when redirecting the traffic, the device is to:
redirect the traffic to the address associated with the one or more particular devices of the plurality of particular devices,
the particular set of devices being identified and the traffic being redirected to the particular set of devices as part of a load-balancing technique,
the traffic being redirected to the particular set of devices to cause the one or more particular devices to:
process the traffic to remove the malicious traffic and leave the legitimate traffic, and
forward the legitimate traffic to the customer via a tunnel,
the tunnel being configured by the customer device without being configured by the one or more particular devices.

16. The system of claim 15, where the tunnel is configured to transmit data from an anycast address, associated with the one or more particular devices, to an address associated with the customer device.

17. The system of claim 15, where the tunnel includes a generic routing encapsulation tunnel that is used by the one or more particular devices to send legitimate traffic to the customer device.

18. The system of claim 15, further comprising the one or more particular devices,
where the one or more particular devices are to:
apply a tunnel encapsulation to the legitimate traffic, and
forward the legitimate traffic with the tunnel encapsulation to the customer via the tunnel.

19. The system of claim 15, where, when identifying the particular set of devices, the device is to:
identify the particular set of devices based on a number of hops between the particular set of devices and the device.

20. The system of claim 15, where the device is further to:
receive, from the customer device, a notification of the network attack.

21. A system comprising:
a network device to:
receive traffic intended for a customer device that is subject of a network attack,
the traffic including malicious traffic and legitimate traffic;
identify a particular set of devices, of a plurality of sets of devices, based on a distance between the network device and each set of devices of the plurality of sets of devices,
the distance between the network device and the particular set of devices being shortest out of the distance between the network device and each set of devices of the plurality of sets of devices,
the particular set of devices including a plurality of particular devices;
set a next-hop attribute of the traffic to an address associated with one or more particular devices of the plurality of particular devices; and
transmit a particular portion of the traffic to the particular set of devices based on setting the next-hop attribute of the traffic,
when transmitting the particular portion of the traffic, the network device is to:
transmit the particular portion of the traffic to the address associated with the one or more particular devices of the plurality of particular devices,
the particular set of devices being identified and the particular portion of the traffic being transmitted to the particular set of devices as part of a load-balancing technique,
the particular portion of the traffic being transmitted to the particular set of devices to cause the one or more particular devices to:
process the particular portion of the traffic to remove the malicious traffic and leave the legitimate traffic, and
forward the legitimate traffic to the customer via a generic routing encapsulation (GRE) tunnel,
the GRE tunnel being configured by the customer device without being configured by the one or more particular devices.

22. The system of claim 21, where the network device is further to:

transmit additional traffic, intended for the customer device, to another particular set of devices of the plurality of sets of devices,
  the other particular set of devices including other particular devices,
  the additional traffic being transmitted to the other particular devices to cause one or more of the other particular devices to:
    process the additional traffic to remove additional malicious traffic from the additional traffic to obtain additional legitimate traffic, and
    forward the additional legitimate traffic to the customer device via another GRE tunnel,
      a configuration of the other GRE tunnel being same as a configuration of the GRE tunnel.

23. The system of claim 21, where the network device is further to:
  forward a portion of other traffic to a first set of devices of the plurality of sets of devices, and
  forward another portion of the other traffic to a second set of devices of the plurality of sets of devices.

24. The method of claim 9, further comprising:
transmitting additional traffic, intended for the customer device, to another particular set of devices of the plurality of sets of devices,
  the other particular set of devices including other particular devices,
  the additional traffic being transmitted to the other particular devices to cause one or more of the other particular devices to:
    process the additional traffic to remove additional malicious traffic from the additional traffic to obtain additional legitimate traffic, and
    forward the additional legitimate traffic to the customer device via another GRE tunnel,
      the other GRE tunnel being configured by the customer device, without being configured by the one or more of the other particular devices, using a configuration that is same as a configuration of the GRE tunnel.

* * * * *